United States Patent
Vandekerkhove

(10) Patent No.: US 8,930,097 B2
(45) Date of Patent: Jan. 6, 2015

(54) DEVICE FOR EVALUATING THE TRANSVERSE ACCELERATION OF AN AUTOMOBILE VEHICLE AND CORRESPONDING METHOD

(75) Inventor: Remi Vandekerkhove, Paris (FR)

(73) Assignee: Renault S.A.S., Boulogne-Billancourt (FR)

( * ) Notice: Subject to any disclaimer, the term of this patent is extended or adjusted under 35 U.S.C. 154(b) by 1009 days.

(21) Appl. No.: 13/003,392

(22) PCT Filed: Jun. 26, 2009

(86) PCT No.: PCT/FR2009/051226
§ 371 (c)(1),
(2), (4) Date: Apr. 11, 2011

(87) PCT Pub. No.: WO2010/004178
PCT Pub. Date: Jan. 14, 2010

(65) Prior Publication Data
US 2011/0178685 A1 Jul. 21, 2011

(30) Foreign Application Priority Data
Jul. 9, 2008 (FR) ...................................... 08 54669

(51) Int. Cl.
| | |
|---|---|
| *G06F 7/00* | (2006.01) |
| *G06F 17/00* | (2006.01) |
| *G06F 19/00* | (2011.01) |
| *B60T 8/172* | (2006.01) |
| *B60W 40/109* | (2012.01) |

(52) U.S. Cl.
CPC .............. *B60T 8/172* (2013.01); *B60W 40/109* (2013.01); *B60W 2510/1005* (2013.01); *B60W 2520/26* (2013.01); *B60W 2520/28* (2013.01); *B60W 2540/10* (2013.01)
USPC ........................................................ 701/51

(58) Field of Classification Search
CPC ..................... B60W 2520/26; B60W 2720/26; B60W 2520/28
USPC ............. 701/51, 1, 36, 41, 48, 53, 54, 58, 60, 701/61, 65, 69, 71, 72, 74, 78, 79, 82, 83, 701/90, 95
See application file for complete search history.

(56) References Cited

U.S. PATENT DOCUMENTS 5,140,524 A * 8/1992 Matsuda .......................... 701/72
5,216,608 A * 6/1993 Ito et al. .......................... 701/90
(Continued)

FOREIGN PATENT DOCUMENTS

| | | |
|---|---|---|
| DE | 44 03 335 | 8/1994 |
| DE | 44 29 242 | 2/1995 |

(Continued)

OTHER PUBLICATIONS

International Search Report issued Nov. 6, 2009 in PCT/FR09/051226 filed Jun. 26, 2009.

*Primary Examiner* — Khoi Tran
*Assistant Examiner* — Harry Oh
(74) *Attorney, Agent, or Firm* — Oblon, Spivak, McClelland, Maier & Neustadt, L.L.P.

(57) ABSTRACT

A device for evaluating the transverse acceleration of a motor vehicle measures the rotational speeds of two wheels of the vehicle, estimates the transverse acceleration of the vehicle from these speeds, and calculates, as a function of vehicle operating parameters, particularly of the rotational speeds of the wheels and of the transmission ratio engaged, a Boolean slip variable which is negative if the transverse estimated acceleration is relevant for detecting a bend, and which is positive if the reverse is true.

11 Claims, 3 Drawing Sheets

(56) References Cited

U.S. PATENT DOCUMENTS

| | | | |
|---|---|---|---|
| 5,357,798 A * | 10/1994 | Weinzerl et al. | 73/146 |
| 5,504,680 A | 4/1996 | Yamashita et al. | |
| 5,555,499 A * | 9/1996 | Yamashita et al. | 701/84 |
| 5,669,677 A | 9/1997 | Fischer | |
| 5,671,144 A * | 9/1997 | Ryan et al. | 701/84 |
| 5,716,301 A * | 2/1998 | Wild et al. | 477/97 |
| 5,829,847 A * | 11/1998 | Tozu et al. | 303/167 |
| 5,876,101 A * | 3/1999 | Taniguchi et al. | 303/146 |
| 6,026,343 A * | 2/2000 | Ogino | 701/72 |
| 6,212,462 B1 * | 4/2001 | Ohtsu et al. | 701/72 |
| 6,571,164 B1 * | 5/2003 | Henneken et al. | 701/87 |
| 6,954,140 B2 * | 10/2005 | Holler | 340/438 |
| 2001/0020209 A1 | 9/2001 | Poggenburg et al. | |
| 2002/0022915 A1 * | 2/2002 | Chen et al. | 701/42 |
| 2003/0195690 A1 * | 10/2003 | Batistic et al. | 701/72 |
| 2004/0176890 A1 * | 9/2004 | Acker et al. | 701/38 |
| 2005/0140207 A1 | 6/2005 | Goebels et al. | |
| 2005/0143892 A1 * | 6/2005 | Batistic et al. | 701/82 |
| 2007/0164606 A1 | 7/2007 | Goebels et al. | |
| 2007/0179699 A1 * | 8/2007 | Kinsey | 701/82 |
| 2008/0255744 A1 * | 10/2008 | Yasui et al. | 701/70 |
| 2009/0276134 A1 * | 11/2009 | Sherman | 701/82 |
| 2010/0106392 A1 * | 4/2010 | Charrier et al. | 701/111 |

FOREIGN PATENT DOCUMENTS

| | | |
|---|---|---|
| DE | 195 10 104 | 8/1996 |
| DE | 195 28 625 | 2/1997 |
| DE | 199 11 301 | 9/2000 |
| DE | 199 62 328 | 6/2001 |

* cited by examiner

DEVICE FOR EVALUATING THE TRANSVERSE ACCELERATION OF AN AUTOMOBILE VEHICLE AND CORRESPONDING METHOD

BACKGROUND

The present invention relates to a method for detecting a turning situation with a view, notably, to generating a setpoint for a transmission of an automobile vehicle drive train. It also relates to a device implementing such a detection method.

An automobile vehicle automatic transmission conventionally comprises a control unit receiving one or more input parameters representing, amongst others, the state of the road: slope, change of slope, curvature, etc. Then, depending on the values of these parameters, the control unit delivers a transmission ratio setpoint to be applied, with interposition, where necessary, of "disable" commands temporarily prohibiting gear-ratio up-shift or down-shift changes for an enhanced driving comfort, for example in certain cases where the vehicle is in a turning situation. In a turning phase, a driver driving an automobile vehicle equipped with a conventional automatic transmission is indeed subjected to uncomfortable driving situations.

For example, going into a turn, the driver generally releases the accelerator pedal. The automatic gearbox that was initially on a given ratio then goes directly to the higher ratio owing to the conventional gear-change rules for an automatic gearbox. The vehicle thus no longer benefits from the engine braking effect. The switch to a higher gear ratio then causes an unpleasant swerving sensation for the automobile vehicle.

Methods and associated devices are already known from the prior art that allow adaptations to be applied to try and improve the comfort of the driver and the passengers in a turning phase.

The patent FR 2 779 793 filed by the applicant describes a system for automatic adaptation of a vehicle gearbox in a turning situation. The system detects a turning situation according to the transverse acceleration of the vehicle, then adapts the gear ratio change strategy as a function of the engine speed and the resistive forces applied to the vehicle.

The transverse acceleration may be determined either by accelerometers or calculated from the rotational speeds of a right and of a left non-driven wheel of the vehicle, such as described in the patent FR 2802 646 filed by the applicant. The calculation proposed by the patent FR 2802 646 assumes that the wheels adhere to the road without slipping and therefore requires the speed sensors to measure the rotation of non-driven wheels of the vehicle.

The patent GB 2 381 873 (Robert Bosch GmbH) involves the simultaneous use of a transverse acceleration calculation from the speeds of the wheels of the vehicles, and the results of measurement from a transverse accelerometer, in order to evaluate the transverse acceleration with more reliability. This patent proposes that the values of transverse acceleration exceeding a predefined threshold are put aside as non-valid, that this acceleration comes from the accelerometer measurement or deduced from the speeds of the wheels. This patent proposes that the interpretation of the transverse acceleration be suspended in the case of excessive skidding, defined by a wheel speed on the inside of the turning circle greater than the forward speed of the vehicle, or by a wheel speed on the outside of the turning circle less than the forward speed of the vehicle. This method requires the simultaneous presence of wheel speed sensors and of a transverse accelerometer, with the associated costs and operational issues.

BRIEF SUMMARY

The present invention aims to overcome the shortcomings of the aforementioned documents. The subject of the present invention is a method allowing the detection of the phases during which the slipping of the drive wheels with respect to the ground is too great which leads to an overestimation of the transverse acceleration. Such an overestimation may indeed lead to an up-shift gear change being inadvertently prevented in the absence of a curve in the road that would justify such a prevention.

The subjects of the present invention are a device and a method for evaluating the transverse acceleration of the vehicle that uses sensors already installed on the vehicle for other purposes. The invention notably allows the data from drive wheel speed sensors on the vehicle to be utilized, and in this respect is particularly advantageous for improving the driving comfort for vehicles that do not dispose of means of measuring the speed of the non-driven wheels of the vehicle.

The principle of the invention consists in carrying out a first estimation of the transverse acceleration of the vehicle based on the rotational speeds of a right wheel and of a left wheel, then in carrying out a series of tests in order to verify whether this estimated value is reliable or not. If the reliability of the estimated value is not confirmed, an arbitrary value is assigned to the transverse acceleration, for example a zero value, or another constant identifiable by the control processes that use this transverse acceleration. The reliability tests are carried out depending on other operating parameters of the vehicle which are also accessible in the "series" configuration of the vehicle, in other words without any sensor specific to the invention.

In one embodiment, a device for evaluating the transverse acceleration of an automobile vehicle comprises means of measuring the rotational speeds of two wheels of the vehicle and a module for estimating the transverse acceleration of the vehicle from these speeds. The device also comprises a validation module capable of calculating, as a function of operating parameters of the vehicle, notably of the rotational speeds of said wheels and of the transmission ratio engaged, a Boolean skidding variable which is negative if the transverse acceleration estimated by the module is relevant for detecting a turn, and which is positive if the reverse is true.

Advantageously, said wheels are a right drive wheel and a left drive wheel belonging to one and the same wheel set of the vehicle.

In one variant embodiment, the device also comprises a correction module capable of delivering a corrected value of the transverse acceleration in such a manner that said corrected value is equal to the previous estimated value of the transverse acceleration if the Boolean skidding variable is negative, and that this corrected value is equal to an arbitrary constant if the reverse is true.

This variant can comprise a delay device inducing a time delay either for the change in value, from positive to negative, of the skidding variable, or for the change in value of the corrected value of the transverse acceleration when it ceases to be equal to said arbitrary constant.

In one preferred embodiment, the validation module comprises a first Boolean module capable of delivering a first Boolean wheel over-acceleration variable. This module comprises a first means of calculating the accelerations of the two wheels, a second means of calculating a plausible acceleration threshold for these wheels as a function of the transmission ratio engaged, first means of comparison of the accelerations of each of the two wheels with respect to said plausible acceleration threshold, second means of comparison of the difference in speed between the two wheels with respect to a difference threshold, and means of storing the Boolean wheel over-acceleration variable.

In one preceding variant embodiment, the validation module also comprises a second Boolean module receiving the value of the acceleration setpoint from the driver and capable of delivering a second in-turn Boolean pedal application variable. This validation module comprises a summing means which adds together the Boolean wheel over-acceleration variable and the in-turn Boolean pedal application variable in order to obtain the Boolean skidding variable.

Preferably, in this variant embodiment, the second Boolean module comprises a means of determining the derivative of the acceleration setpoint from the driver with respect to time, comprises means of comparison of the acceleration setpoint, of its derivative and of the previously estimated transverse acceleration, with respect to three values of setpoint threshold, of setpoint derivative threshold, of accelerated centrifugation threshold, respectively, and comprises means of storing the in-turn Boolean pedal application variable.

In another embodiment, a device for detecting a turning situation for controlling an automobile vehicle mechanism, notably for automatic transmission control, comprises one of the evaluation devices described hereinabove, together with an arbitration module capable of deciding whether the vehicle is in a turning situation. This arbitration module comprises a means of comparison of the transverse acceleration of the vehicle with respect to a first value of arbitration threshold. It can also comprise a means of comparison of the derivative of the acceleration with respect to time of this acceleration, with respect to a second value of arbitration threshold. Advantageously, the arbitration module can be configured for deciding that the vehicle is in a turning situation if the estimated transverse acceleration or its derivative is greater than their respective arbitration thresholds.

According to another aspect, a method is provided for evaluating the transverse acceleration of an automobile vehicle, in which the rotational speeds of two drive wheels of the vehicle are measured, the transverse acceleration of the vehicle is estimated from these wheel speeds, and a Boolean skidding variable is calculated as a function of operating parameters of the vehicle, notably of the rotational speeds of said drive wheels and of the transmission ratio engaged, which variable is negative if the transverse acceleration estimated by the module is relevant for detecting a turn and which is positive if the reverse is true.

In one variant embodiment of this method, the calculation of the Boolean skidding variable can also take into account the acceleration setpoint from the driver, for example the position of the accelerator pedal of the vehicle and/or the derivative with respect to time of this position of the accelerator pedal.

In one preferred embodiment of the method, if the skidding variable is positive, the corresponding transverse acceleration is then corrected by assigning it an arbitrary value.

Advantageously, the Boolean skidding variable is the sum of a first Boolean wheel over-acceleration variable and of a second Boolean in-turn pedal application variable whose calculation comprises the following steps:

using a stored data map, a first plausible wheel acceleration threshold is calculated as a function of the transmission ratio engaged; if the derivative with respect to time of one of the measured wheel rotational speeds is greater than this first plausible wheel acceleration threshold, the wheel over-acceleration variable is positive; if the two derivatives with respect to time of the measured wheel rotational speeds are less than this first plausible wheel acceleration threshold and if, simultaneously, the difference in rotational speeds of the two wheels is less than a (constant) difference threshold, the wheel over-acceleration variable is negative; in the other cases, the wheel over-acceleration variable keeps its value;

the derivative with respect to time of the acceleration setpoint from the driver is calculated;

the acceleration setpoint from the driver, its derivative and the estimated transverse acceleration of the vehicle are compared with respect to three values of setpoint threshold, of setpoint derivative threshold and of accelerated centrifugation threshold; if the three values are simultaneously greater than their respective thresholds, the in-turn pedal application variable is positive; if the transverse acceleration of the vehicle is less than its respective threshold, the in-turn pedal application variable is negative; in the other cases, the in-turn pedal application variable keeps its value.

BRIEF DESCRIPTION OF THE DRAWINGS

Other advantages and features will become apparent upon examining the detailed description of one non-limiting embodiment and of the appended drawings, in which.

DETAILED DESCRIPTION

In the following description, analogous, identical or similar elements will be denoted by the same reference numbers.

Figure 1:
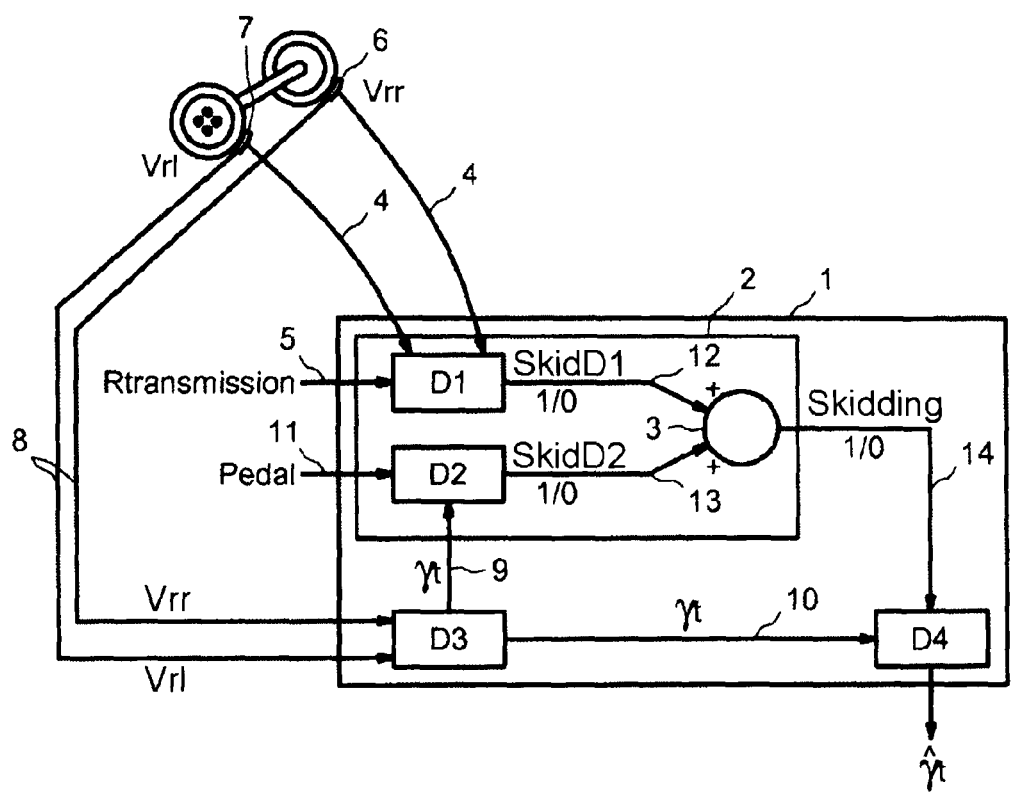
FIG. 1 is a schematic diagram of one exemplary embodiment of a device for calculating the transverse acceleration of a vehicle according to the invention.

As it is illustrated in FIG. 1, a device for evaluating the transverse acceleration of a vehicle (not shown) comprises a validation module 2, a module for estimating the transverse acceleration D3 and a correction module D4. The validation module 2 itself comprises two logic blocks D1 and D2 and a logic adder 3. The logic block D1 receives, via connections 4, the values of the rotational angular speeds Vrr and Vrl respectively coming from a rotational speed sensor 6 of a right wheel and a rotational speed sensor 7 of a left wheel from one and the same wheel set of a vehicle. The block D1 receives, via a connection 5, the value "Rtransmission" of the ratio engaged in the transmission system of the vehicle. The module for estimating the transverse acceleration D3 receives, via connections 8, the same values of rotational speeds Vrr and Vrl coming from the sensors 6 and 7. The module D3 transmits an estimated value γt of transverse acceleration via a connection 9 to the logic block D2, and transmits the same value γt, via a connection 10, to the correction module D4. The logic block D2 also receives, via a connection 11, a value "pedal" corresponding to the acceleration setpoint from the driver, which can for example be the angular position of an accelerator pedal. This acceleration setpoint could also correspond, amongst other things, to an accelerator throttle angle, an acceleration regulator position or an angle of the gas inlet butterfly valve. The values transiting via the connections 5 and 11 can, for example, be sent by an onboard computer and transmitted to the blocks C1 and D2 via the multiplexed network or any other means of communication between processors. The logic blocks D1 and D2 send, respectively, a Boolean value SkidD1 via a connection 12 and a Boolean value SkidD2 via a connection 13 to the logic adder 3 which sends a logic variable "Skidding", via a connection 14, to the correction module D4. The correction module D4 delivers a corrected transverse acceleration $\hat{\gamma}_t$ which can be sent, depending on the applications, to a management system for an automatic control unit of the vehicle, to a control system for the orientation of the headlamps in a turn, or any other system using the transverse acceleration and which can handle the ranges of uncertainty in the calculation of the transverse acceleration according to the invention.

Using the rotational angular speeds of the two wheels Vrr and Vrl, the module for estimating the transverse acceleration D3 carries out an estimation of the transverse acceleration $\gamma t$ that the vehicle would have if neither of the two wheels were in a slipping situation with respect to the road surface. This estimation can for example be carried out by the method described in the patent application FR 2802 646 in the name of the applicant. The value of the transverse acceleration thus estimated $\gamma t$ is transmitted to the block D2 which uses it for calculating the variable SkidD2 and is also transmitted to the correction module D4. Using the operating parameters of the vehicle, i.e. the rotational speeds of the two wheels equipped with the sensors 6 and 7, the transmission ratio engaged and the acceleration setpoint from the driver, together with the transverse acceleration estimated by the block D3, the logic blocks D1 and D2 calculate the Boolean variables SkidD1 and SkidD2. These two values are sent over the adder 3 which delivers, via the connection 14, the Boolean skidding variable "Skidding", being the logic sum of SkidD1 and SkidD2, which is positive if one of the variables SkidD1 or SkidD2 is positive (or denoted as 1) and which is negative (or denoted as 0) if the two variables SkidD1 and SkidD2 are negative (equal to zero). This variable Skidding is therefore negative if the tests carried out by D1 and D2 do not detect the slipping of one of the two wheels; it is positive if slipping of at least one of the wheels is detected.

The correction module D4 calculates a corrected value $\hat{\gamma}_t$ for the transverse acceleration as follows: If the corresponding Boolean Skidding variable at the moment at which the transverse acceleration $\gamma t$ is estimated is negative, the corrected value $\hat{\gamma}_t$ is equal to the estimated value $\gamma t$; if the corresponding Boolean Skidding variable at the moment at which the transverse acceleration $\gamma t$ is estimated is positive, the corrected value $\hat{\gamma}_t$ is equal to an arbitrary value $\hat{\gamma}_o$. The arbitrary value $\hat{\gamma}_o$ can for example be chosen equal to zero so that the management device for the rules for switching the automatic transmission interpret this result as corresponding to an absence of bend in the road. In one variant of the invention, the value $\hat{\gamma}_o$ could be chosen equal to an arbitrary negative constant, for example the value −1. In this way, the system or systems using the value of transverse acceleration can detect a potential skidding situation upon reading $\hat{\gamma}_t$. In one variant embodiment, which may be combined with the preceding one, the correction module D4 can impose a time delay $\delta t$ onto $\hat{\gamma}_t$ (for example of the order of 0.01 seconds to 1 second) by each time maintaining the value $\hat{\gamma}_t$ at its value $\hat{\gamma}_o$ over a period $\delta t$ after the Boolean variable Skidding has become negative. The time delay can also be directly imposed onto the variable Skidding when it goes from the positive value (1) to the negative value (0).

Figure 2:
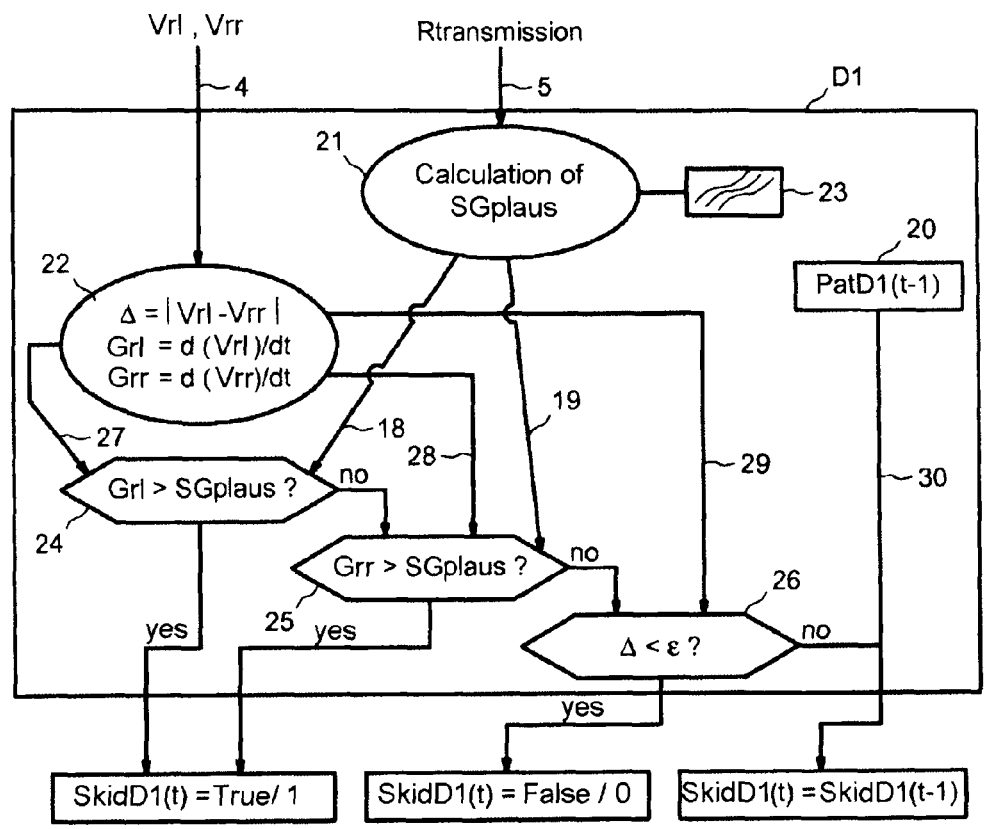
FIG. 2 shows one exemplary embodiment of a logic block from FIG. 1 in more detail.

FIG. 2 shows a flow diagram for calculation of the wheel over-acceleration Boolean variable SkidD1 by the logic block D1 in FIG. 1. At a calculation time t, the block D1 receives, via the connection 4, the rotational angular speed values of two wheels Vrl and Vrr from one and the same set and receives, via the connection 5, the identifier of the transmission ratio engaged. In parallel, the block D1 saves in a memory 20 the value of the Boolean variable SkidD1 calculated at the preceding calculation time (calculation time t−1). The connection 4 is connected to a processing block 22 and the connection 5 is connected to a processing block 21, capable of reading in a data map stored in memory 23. Based on the value stored in the memory 20 and on the values calculated by the blocks 21 and 22, three test blocks 24, 25, 26 allow a value to be assigned to the Boolean variable SkidD1 at time t. The processing block 22 calculates the accelerations Grl and Grr of the two wheels by differentiating their speeds Vrl and Vrr with respect to time. The block 22 also calculates the absolute value of the difference $\Delta$ in the two speeds Vrl and Vrr, being $\Delta=|Vrl-Vrr|$. The two values Grl and Grr are sent, via the connections 27 and 28, to the test blocks 24 and 25, respectively. The value $\Delta$ is sent to the test block 26 via the connection 29. Depending on the transmission ratio engaged "Rtransmission", the processing block 21 extracts from the data map 23 the value SGplaus representing the plausible acceleration threshold for a wheel Grl or Grr in the absence of slipping of this wheel. This mapped threshold SGplaus is chosen such that SGplaus multiplied by the radius of a wheel is close to the value of the maximum acceleration that the vehicle can reach for the transmission ratio engaged. This value SGplaus is sent to the test blocks 24 and 25 via the connections 18 and 19, respectively. The blocks 24 and assign a positive value (or denoted as 1) to the value SkidD1 if one of the wheel accelerations is greater than the plausible value SGplaus. The block 26 analyzes the case where the two values Grl and Grr are within the range of plausibility, in other words less than SGplaus. If the difference $\Delta$ between the two wheel speeds is reduced, in other words less than an arbitrary difference threshold $\epsilon$ (close to zero, for example $\epsilon$ equals 0.1 km/h), the case of skidding is no longer considered and SkidD1 takes a negative value (also denoted as 0). If the two values Grl and Grr are within the range of plausibility and if the difference between the two wheel speeds is greater than the threshold $\epsilon$, the block 26 assigns the value, extracted from the memory 20 via the connection 30, that SkidD1 had at the preceding calculation time (time t−1), to the value SkidD1 at time t. In this way, in the block D1, an onset of wheel skidding is detected when one of the wheel accelerations goes above the plausibility threshold, and the Boolean variable continues to indicate the skidding state for as long as the two wheel speeds do not go through an identical value. Indeed, in practice, the onset of the skidding is characterized by an abrupt increase in the speed of the wheel on the inside of the turn, hence by a spike in acceleration of the wheel in question. The blocks 24 and 25 detect these onsets of skidding. The end of the skidding is characterized by a crossing of the curves of the speeds of the two wheels, because the speed of the wheel on the inside of the turn is lower than the speed of the wheel on the outside when they both drive without skidding. The block 26 therefore detects this end of skidding.

The logic block D1 is able to detect most in-turn skidding phenomena thanks to the calibration of the plausible wheel accelerations stored in the data map 23. In one variant embodiment of the invention, the logic block D1 can, on its own, form the validation module 2, in which case the variable Skidding is identical to the variable SkidD1. The thresholds SGplaus from the data map 23 are calibrated at values that are sufficiently high to limit the number of false skidding detections (result of calculation Skidding=1 whereas neither of the two wheels skids). If the vehicle is in an over-steer situation, the invention thus avoids the transverse acceleration $\gamma t$ being detected as invalid, which is notably necessary for correct management of the automatic transmission gear-change rules. The corollary is that, on the other hand, some cases of skidding are not then detected by the logic block D1.

The role of the logic block D2, whose operation is detailed in FIG. 2, is to pick up some of the cases of skidding undetected by the block D1 owing to the calibration chosen for the thresholds from the data map 23. The logic block D2 detects specifically the cases of skidding caused by depressing the accelerator pedal during a turn. It does not therefore detect any case of skidding corresponding to an over-steer situation, since the cases of over-steer occur when the accelerator pedal is released.

Figure 3:
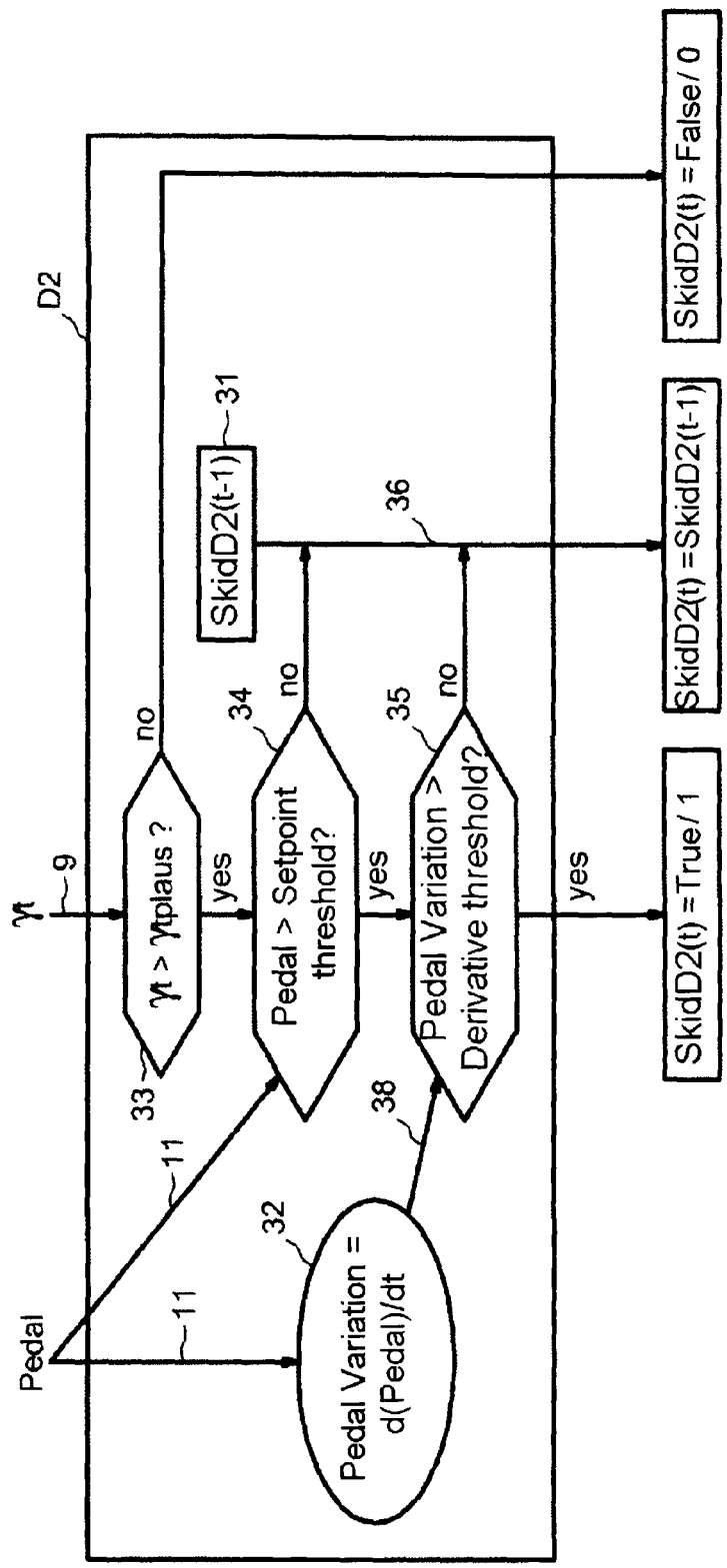
FIG. 3 shows one exemplary embodiment of another logic block from FIG. 1 in more detail.

FIG. 3 shows a flow diagram for the calculation of the Boolean wheel over-acceleration variable SkidD2 by the logic block D2 in FIG. 1. At a calculation time t, the block D2 receives, via the connection 9, the value of the transverse acceleration γt estimated by the block D3 in FIG. 1 and receives, via the connection 11, the acceleration setpoint from the driver, represented by the angular position "Pedal" of the accelerator pedal of the vehicle. In parallel, the block D2 saves in a memory 31 the value of the Boolean variable SkidD2 calculated at the preceding calculation time (calculation time t−1). The logic block D2 comprises a processing block 32 and three test blocks 32, 34 and 35 which, based on the value stored in the memory 31, on the value calculated by the processing block 32 and on the values γt and Pedal, allow a value to be assigned to the Boolean variable SkidD2 at time t. The connection 11 is connected to the processing block 32 and to the test block 34. The processing block 32 returns a value "Pedal Variation" to the test block 35 via a connection 38. The test block 35 can access the memory 31 via a connection 36. The block 33 carries out a comparison between the transverse acceleration γt estimated by the block D3 and an accelerated centrifugation threshold $\gamma t_{plaus}$. If γt is less than the threshold $\gamma t_{plaus}$, the case of skidding is no longer considered, and the block 33 assigns a negative value (also denoted as 0) to SkidD2 at time t. The block 32 calculates the derivative with respect to time of the variable Pedal and delivers, via the connection 38, a value Pedal Variation representing the angular speed of displacement of the accelerator pedal. In the case where γt is less than the accelerated centrifugation thresholdt $\gamma t_{plaus}$, the test blocks 34 and 35 carry out the comparisons of the value Pedal and of its derivative Pedal Variation with respect to two constant thresholds "Setpoint Threshold" and "(Setpoint) Derivative Threshold", respectively. If the value Pedal and the value of its derivative Pedal Variation are both greater than their respective thresholds, the value SkidD2 at time t takes the positive value (also denoted as 1). If the reverse is true, the block 35 assigns the value, extracted from the memory 31 via the connection 36, that SkidD2 had at the preceding calculation time (time t−1) to the value SkidD2 at time t. The role of the block D2 is to detect the cases of skidding occurring when the accelerator pedal is depressed by the driver in a turn, notably in the situations where the skidding situation has not been detected by the logic block D1. For this purpose, the accelerated centrifugation threshold $\gamma t_{plaus}$, which is a constant value, is advantageously chosen to be high within the range of the plausible accelerations of the vehicle. In practice, an acceleration close to 10 ms$^{-2}$, for example in the range between 8 and 12 ms$^{-2}$, allows a reasonable level of detection to be obtained.

One of the applications of the method is the management of the gear-change rules for the transmission as a function of the curvature of the road on which the vehicle is being driven. The application of the method of the invention is not however limited to this management of the transmission ratios: it can be applied to the management of any mechanism on the vehicle which requires an estimation of the transverse acceleration of the vehicle, and which is however capable of functioning without the availability of this information during cases of skidding of the drive wheels.

It goes without saying that the reasoning described above on the choice of the Boolean variables and the values that are assigned to them should be understood in the functional sense. The positive and negative values of the variables could be denoted by other pairs of values, Yes/No, True/False, Skidding/Gripping, etc. The Boolean variables could have the opposite definitions to that in the description and the claims and the stated logical proposals then being reformulated accordingly.

The implementation of the invention in the form of logic blocks or processing blocks can take the form of electronic components or physically independent processors configured as described above. The invention may also be implemented by programming all the logic blocks and the processing blocks described in the form of software code, the corresponding program, together with its sub-programs, being installed in one or more processors, integrated or otherwise with the electronic control unit.

The invention allows comfort functions using the value of the transverse acceleration, such as the management of the gear-change rules for an automatic gearbox or the orientation of the headlamps in a turn, to be provided at a lower cost on vehicles equipped with only two wheel speed sensors on its drive wheels (for example for front-wheel drive vehicles without ABS).

The invention claimed is:

1. A device for evaluating transverse acceleration of an automobile vehicle, comprising:
   means for measuring rotational speeds of two wheels of the vehicle;
   a module that estimates the transverse acceleration of the vehicle from the measured speeds; and
   a validation module that calculates, as a function of operating parameters of the vehicle, a Boolean skidding variable which is negative if slipping of one of the two wheels is not detected, and which is positive if slipping of at least one of the two wheels is detected,
   in which the validation module comprises a first Boolean module that delivers a first Boolean wheel over-acceleration variable, which first Boolean module comprises first means for calculating the accelerations of the two wheels, second means for calculating a plausible acceleration threshold for the wheels as a function of the transmission ratio engaged, first means for comparison of the accelerations of each of the two wheels with respect to the plausible acceleration threshold, second means for comparison of the difference in speed between the two wheels with respect to a difference threshold, and means for storing the Boolean wheel over-acceleration variable,
   wherein the first Boolean module assigns a positive value to the wheel over-acceleration variable if the first means for comparison determines that the acceleration of either of the two wheels is greater than the plausible acceleration threshold, and
   in which, when the acceleration of either of the two wheels is not greater than the plausible acceleration threshold, the first Boolean module assigns a negative value to the wheel over-acceleration variable if the second means for comparison determines that the difference between speeds of the two wheels is less than the difference threshold, and the first Boolean module assigns a value that the wheel over-acceleration variable had at a preceding calculation time, extracted from the means for storing, to the wheel over-acceleration variable if the second means for comparison determines that the difference between speeds of the two wheels is less than the difference threshold.

2. The evaluation device as claimed in claim 1, in which the wheels are a right drive wheel and a left drive wheel belonging to one and a same wheel set of the vehicle.

3. The evaluation device as claimed in claim 1, further comprising:
a correction module that delivers a corrected value of the transverse acceleration such that the corrected value is equal to a previous estimated value of the transverse acceleration if the Boolean skidding variable is negative, and the corrected value is equal to an arbitrary constant if the Boolean skidding variable is positive.

4. The evaluation device as claimed in claim 1, in which the validation module further comprises a second Boolean module receiving the value of an acceleration setpoint from the driver and that delivers an in-turn Boolean pedal application variable, and in which the validation module comprises a summing means that adds together the Boolean wheel over-acceleration variable and the in-turn Boolean pedal application variable to obtain the Boolean skidding variable.

5. The evaluation device as claimed in claim 4, in which the second Boolean module comprises means for determining the derivative of the acceleration setpoint from the driver with respect to time, comprises means for comparison of the acceleration setpoint with respect to a setpoint threshold, of the derivative of the acceleration setpoint with respect to a setpoint derivative threshold, and of a previously estimated transverse acceleration with respect to an accelerated centrifugation threshold, and comprises means for storing the in-turn Boolean pedal application variable.

6. A device for detecting a turning situation for controlling an automobile vehicle mechanism, or for automatic transmission control, comprising:
an evaluation device as claimed in claim 1; and
an arbitration module that decides whether the vehicle is in a turning situation, the arbitration module comprising means for comparison of the transverse acceleration of the vehicle with a first value of arbitration threshold and of the derivative with respect to time of the transverse acceleration with a second value of arbitration threshold.

7. A method for evaluating the transverse acceleration of an automobile vehicle, comprising:
measuring, via sensors of the vehicle, rotational speeds of two drive wheels of the vehicle;
estimating transverse acceleration of the vehicle from the measured wheel speeds; and
calculating, via a processor of the vehicle, a Boolean skidding variable as a function of operating parameters of the vehicle, which variable is negative if slipping of the two wheels is not detected, and which is positive if slipping of at least one of the two wheels is detected,
wherein the calculating of the Boolean skidding variable further includes determining a first Boolean wheel over-acceleration variable, and
in which the first Boolean wheel over-acceleration variable is determined by determining, using a stored data map, a plausible wheel acceleration threshold as a function of the transmission ratio engaged; if the derivative with respect to time of one of the measured wheel rotational speeds is greater than the plausible wheel acceleration threshold, the wheel over-acceleration variable is positive; if the two derivatives with respect to time of the measured wheel rotational speeds are less than this plausible wheel acceleration threshold and if, simultaneously, the difference in rotational speeds of the two wheels is less than a difference threshold, the wheel over-acceleration variable is negative; and in other cases, the wheel over-acceleration variable maintains a previous value.

8. The evaluation method as claimed in claim 7, in which, if the skidding variable is positive, the corresponding transverse acceleration is then corrected by assigning it an arbitrary value.

9. The evaluation method as claimed in claim 7, in which the Boolean skidding variable is the sum of the first Boolean wheel over-acceleration variable and of an in-turn Boolean pedal application variable whose calculation comprises:
the derivative with respect to time of an acceleration setpoint from the driver is calculated;
the acceleration setpoint from the driver is compared with respect to a setpoint threshold, the derivative of the acceleration setpoint is compared with respect to a setpoint derivative, and the estimated transverse acceleration of the vehicle is compared with respect to an accelerated centrifugation threshold; if the three values are simultaneously greater than their respective thresholds, the in-turn Boolean pedal application variable is positive; if the transverse acceleration of the vehicle is less than its respective threshold, the in-turn Boolean pedal application variable is negative; in other cases, the in-turn Boolean pedal application variable keeps its value.

10. The evaluation device as claimed in claim 1, in which the difference threshold is equal to 0.1 km/h.

11. The evaluation method as claimed in claim 7, in which the difference threshold is equal to 0.1 km/h.

* * * * *